INVENTOR.
ROBERT BRUCE SWITZER
BY
Edward A. Robinson
ATTORNEY

Jan. 27, 1970 R. B. SWITZER 3,492,637

INDUCTIVE LOOP VEHICLE DETECTOR

Filed Nov. 29, 1965 4 Sheets-Sheet 3

United States Patent Office 3,492,637
Patented Jan. 27, 1970

3,492,637

INDUCTIVE LOOP VEHICLE DETECTOR

Robert Bruce Switzer, Palo Alto, Calif., assignor to Singer-General Precision, Inc., a corporation of Delaware Filed Nov. 29, 1965, Ser. No. 510,338
Int. Cl. G08g *1/00*
U.S. Cl. 340—38 8 Claims

ABSTRACT OF THE DISCLOSURE

The disclosed embodiment of the invention is a vehicle detector which is formed of an oscillator and a tuned circuit coupled to the oscillator by means of an impedance. The tuned circuit includes an inductive loop which is located in close proximity to a vehicular path. The impedance is of a value which minimizes the effect of inductance changes in the loop on the operating frequency of the oscillator, but permits substantial loading of the oscillator by the tuned circuit, especially when the inductance of the loop is changed by the presence of a vehicle in close proximity thereto. A circuit detects the loading on the oscillator indicative of a vehicle in close proximity to the loop to activate a control device.

This invention relates to vehicle presence detectors and more particularly, this invention relates to systems wherein an inductive loop is positioned to generate a magnetic field in a path for vehicles and wherein the inductive characteristics of the loop are varied when the metallic mass of a vehicle moves into the magnetic field of the loop.

Inductive loop vehicle presence detectors are commercially available wherein the inductive loop is connected as a part of a tuned circuit for controlling the frequency of an oscillator. In such a system a vehicle may enter the field of the loop and the inductance value of the loop will vary to change the frequency of the oscillator. A change in the oscillator frequency is sensed to provide an output signal in a system of this sort. Other inductive loop presence detectors use fixed frequency, crystal controlled oscillators for generating a signal which is passed through a phase shifting circuit including an inductive loop. When a vehicle moves into the field of the loop, a change occurs in the phase angle, and a phase discrimination circuit provides an output signal.

It is an object of this invention to provide an improved and economical vehicle presence detector system wherein an inductive loop is included in a resonant circuit coupled to load an oscillator; and more particularly, it is an object to sense the presence of a vehicle over a loop by sensing changes in the loading of the oscillator.

Another object of this invention is to provide an improved vehicle presence detector system wherein an inductive loop receives power from an oscillator signal and passes power by inductive coupling to a vehicle which may be over the loop whereby a change in the power level from the oscillator is sensed to provide an indication of the presence of the vehicle.

A further object is to provide an improved vehicle detection system wherein an inductive loop is included in a resonant circuit coupled to an oscillator through an impedance element; and more particularly, it is a further object to sense the amplitude of the oscillator signal and to provide an output signal upon sensing a decrease in the oscillator signal amplitude which results from an increased loading of the oscillator accompanied by an increased voltage drop across the impedance element.

Numerous other objects and advantages will be apparent throughout the progress of the specification which follows. The accompanying drawings illustrate preferred embodiments of the invention in which.

Figures 1, 3, 4:
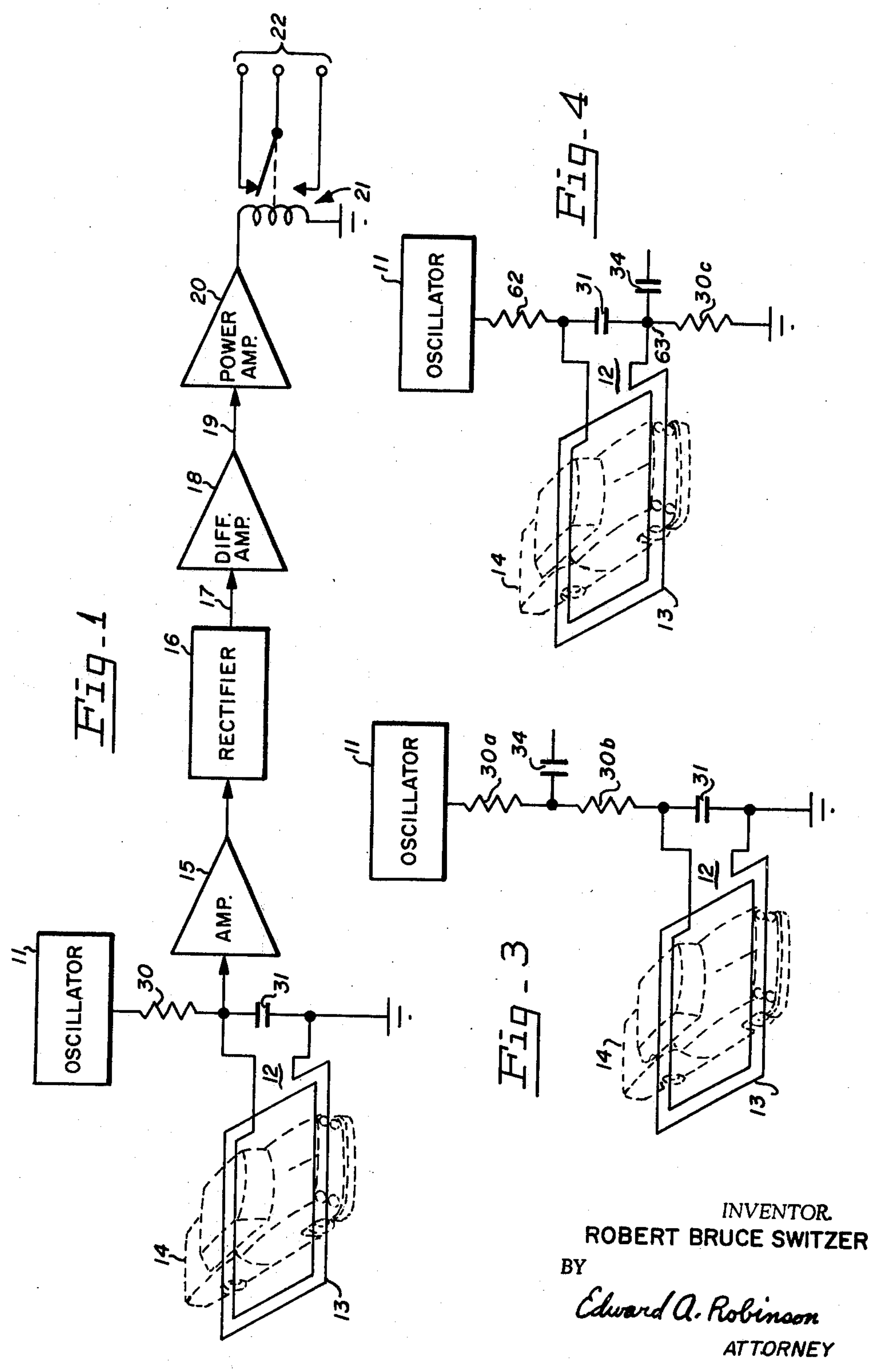
FIGURE 1 is a block diagram of the vehicle presence detector system of this invention.
FIGURE 3 and FIGURE 4 show alternative circuits which may be used in this invention.

Briefly stated with reference to FIGURE 1, an oscillator 11 passes a signal to a tuned circuit 12 including an inductive loop 13. The inductive loop 13 receiving energy from the oscillator may be likened to the primary winding of a transformer, and a vehicle 14 moving over the loop 13 may be likened to shorted turns of a secondary winding. The signal impressed across the loop is amplified by an amplifier circuit 15 and is rectified by a circuit 16 to generate a direct potential level on a line 17 corresponding to the amplitude of the oscillator signal appearing across the tuned circuit 12. When the signal level appearing at the point 17 decreases below a pre-determined threshold value, an amplifier 18 will generate an output signal on a lead 19. In certain applications the output signal of the lead 19 may directly drive further circuitry such as a traffic controller. However, if a positive switching action is preferred, a further amplifying stage 20 may be included to drive an output relay 21, for providing switching at output terminals 22.

Figure 2:
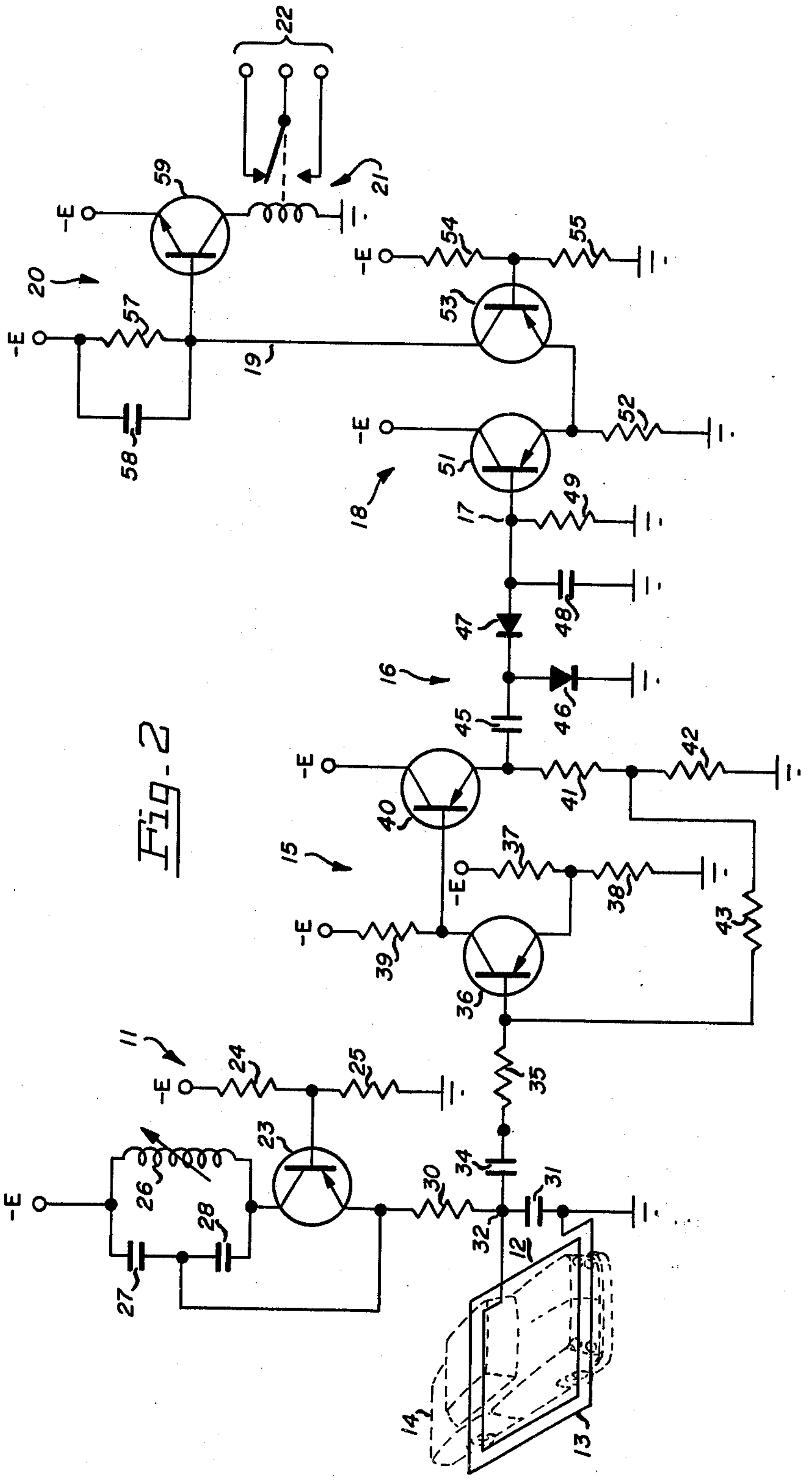
FIGURE 2 is a complete circuit diagram of the system.

As shown in FIGURE 2, the circuit 11 may be a tuned collector oscillator having a single transistor 23. The base electrode of the transistor is biased by a pair of potential dividing resistors 24 and 25 coupled between a negative voltage source —E and ground. The collector electrode is coupled to a negative voltage source —E through a tuned circuit including a variable inductor 26 and a pair of serially connected capacitors 27 and 28. The mid-point connection between the capacitors 27 and 28 is connected to the emitter electrode of the transistor 23 to provide positive feedback to sustain oscillation. The tuned circuit 26–28 is a frequency determining network or tank circuit for the oscillator 11 and this frequency may be controlled by varying the inductance of the element 26.

Signals from the oscillator 11 are passed via a resistor 30 to the tuned circuit 12 which includes the inductive loop 13 and a capacitor 31. When the oscillator 11 is tuned approximately to the resonant frequency of the circuit 12, a maximum impedance exists between a point 32 and ground reference potential. Under these conditions of normal operation, the amplitude of the oscillator signal appearing across the tuned circuit 12 is a maximum. When the metal mass of a motor vehicle 14 moves over the loop 13, the circuit 12 changes its resonant impedance and the effective impedance to ground presented to the oscillator signal is less. Under this out-of-tune condition, the resonant circuit 12 will draw heavier currents from the oscillator 11 such that a substantial voltage drop will appear across the coupling resistor 30, and the amplitude of the signal appearing at the point 32 will decrease. As indicated heretofore, power furnished to the tuned circuit 12 from the oscillator 11 is passed into effective shorted turns presented by the vehicle 14. Therefore, a vehicle 14 moving near the loop 13 tends to increase the loading of the oscillator 11 both by (1) detuning circuit 12 and (2) receiving and dissipating power from the loop.

The resistor 30 and the amplitude sensing circuit including the amplifier 15 and the rectifier 16 constitutes a means for sensing power passed from the oscillator 11 to the tuned circuit 12. The resistor 30 and the tuned circuit 12 may be considered a potential dividing network when the signal amplitude across the tuned circuit is at its greatest when the resonant impedance of the circuit 12 is substantially equaled by the frequency of the oscillator 11. In this condition, the tuned circuit 12 presents a high impedance to the oscillator signal, and a minimum current flow through the resistor 30 results in a minimum potential drop thereacross. When a vehicle moves over the loop, power from the loop is dissipated in the vehicle, and the circuit 12 is de-tuned to present a lower impedance path to ground. Thus, in the vehicle presence condition, a much greater current will be drawn through the resistor 30 from the oscillator 11, and therefore, the voltage drop across the resistor will increase thereby decreasing the amplitude of the signal appearing at the point 32. Therefore, the respective voltage drop across the resistor 30, and across the tuned circuit 12 will be a measure of the power passed from the oscillator to the circuit 12, and the subsequent circuitry, responsive to the amplitude of the signal, senses the power drawn from the oscillator.

The oscillator signal appearing at the point 32 is passed via a coupling capacitor 34 and a resistor 35 to the amplifier 15. The amplifier 15 comprises a first transistor 36 having a base electrode coupled to receive the oscillator signal and having an emitter electrode biased by a pair of potential dividing resistors 37 and 38. The collector electrode of the transistor 36 is coupled to a negative reference potential by a load resistor 39, and is directly connected to the base electrode of a second transistor 40. The transistor 40 is connected as an emitter follower having a collector electrode directly connected to the negative reference potential and having an emitter electrode coupled to ground reference potential by resistors 41 and 42. A resistor 43 provides a negative feedback path for stabilizing the amplifier 15.

The amplified signal is passed via a coupling capacitor 45 to a voltage doubler or rectifier circuit 16. The rectifier circuit 16 includes a first diode 46 coupled between the capacitor 45 and ground reference potential, and a second diode 47 coupled to pass a rectified signal to an integrating capacitor 48 which stores the direct potential level of line point 17. A high valued resistor 49 is shunted across a capacitor 48 to provide a time constant discharge path therefor.

The differential amplifier 18 includes a first transistor 51 having a base electrode thereof coupled to the direct potential level of the line 17 and having a collector electrode directly connected to the negative reference potential. A single load resistor 52 is coupled to the emitter electrodes of both the first transistor 51 and a second transistor 53. The base electrode of the transistor 53 is coupled to a bias point supplied by a pair of potential dividing resistors 54 and 55 which are connected between the negative source voltage —E and the ground potential. Normally, the transistor 51 is conductive such that the potential of the emitter electrodes is substantially that of the negative potential at point 17. Therefore, the second transistor 53 remains nonconductive. When the direct potential level of the point 17 decreases below a threshold value, the transistor 51 becomes less conductive whereupon a transistor 53 conducts to provide an output signal on the lead 19. The collector electrode of the transistor 53 is coupled to the negative reference potential —E by a load resistor 57 and a filter capacitor 58.

As indicated heretofore, the signal appearing on the lead 19 may be used directly by further control circuitry (not shown). However, it may be desired to provide output switching rather than a mere direct potential bias, and in this case, the base electrode of a power amplifier transistor 59 may be coupled to the lead 19. The emitter electrode of the transistor 59 may be directly connected to the negative voltage source —E. The collector electrode of the transistor 59 is coupled to the ground reference potential through the winding of the relay 21 which provides switching contacts coupled to the output terminals 22.

As indicated heretofore, the oscillator 11 was tuned by adjusting the resonant circuit 26–28 which controls the frequency of oscillation. The circuit 12 also has the resonant frequency determined by the inductive characteristics of the loop 13 and the capacitive value of the element 31. When the vehicle presence detector system is in tune with no vehicle near the loop 13, the resonant impedances of the circuit 26–28 and the circuit 12 are substantially equal. The two resonant circuits are not independent of each other, and a change in the tuning of either tends to affect the operation of the oscillator 11. This oscillator circuit may be likened to a tuned collector-tuned emitter oscillator since both the emitter and the collector electrodes of the transistor 23 are coupled to tuned circuits. An interconnection of the tuned circuits may be further appreciated, because the capacitor 31 and loop 13 are coupled to the capacitor 27. The point 32 being one terminal of the tuned circuit 12 is coupled to one terminal of the capacitor 27 via the resistor 30; and the grounded terminal of the tuned circuit 12 is coupled to the opposite terminal of the capacitor 27 via the power supply. Therefore, the tuned circuit 12 is not completely isolated from the tuned circuit 26–28 of the oscillator 11. The intercoupling between the two tuned circuits has not proved to be detrimental to the operation of the vehicle presence detector systems which have been built in accordance with this invention.

FIGURE 3 shows an alternative arrangement for coupling the tuned circuit 12 to the oscillator 11. Two serially connected resistors **30*a* and 30*b* may replace the single resistor 30 of FIGURES 1 and 2. This arrangement provides a connection point 61 to which the amplifier 15 and subsequent circuitry of FIGURE 2 may be coupled. It has been found experimentally that an improved sensitivity is gained by providing the potential dividing resistors 30*a* and 30*b* such that the amplifier 15** is coupled to the oscillator signal of slightly increased amplitude.

In FIGURE 4 the positions of the tuned circuit 12 and the resistor 30 have been reversed from that shown in FIGURES 1 and 2. The tuned circuit 12 may be coupled either directly or through a low valued resistor 62 to the oscillator 11 and a principal resistor **30*c* is coupled between the resonant circuit and the ground reference potential. A point 63 is thereby provided which may be coupled to the amplitude sensing circuitry 15, 16 and 18 to generate an output signal. In the arrangement of FIGURE 4, the amplitude of the signal appearing at the point 63 may have a variation of polarity from the circuits of FIGURES 1 and 2, since the potential dividing arrangement between the resistor and the tuned circuit 12** is changed.

Figure 5:
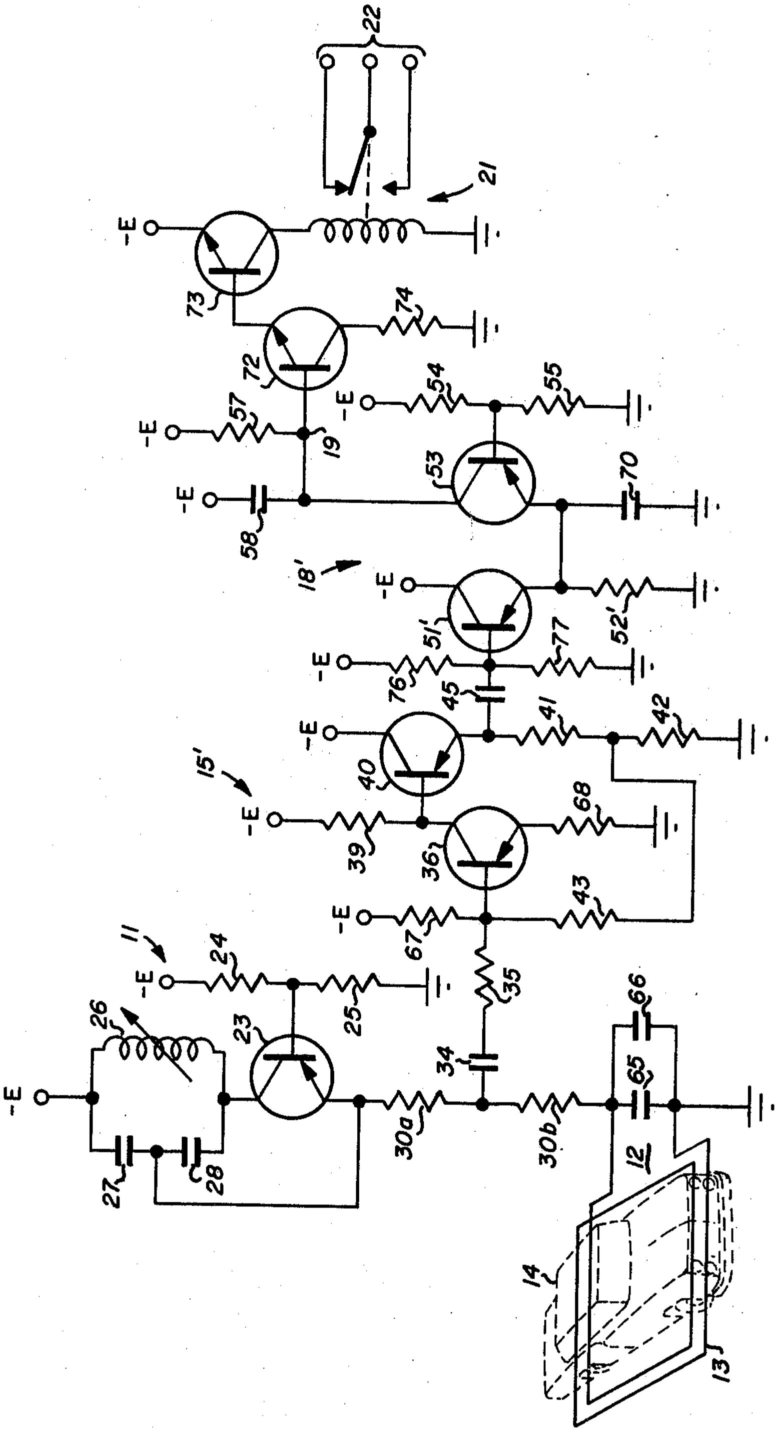
FIGURE 5 and FIGURE 6 show further presence detector systems using other alternative circuits.

FIGURE 5 illustrates another form of the presence detector system illustrating certain variations of the circuits disclosed above. As in FIGURE 3 an oscillator 11 passes signals through coupling resistors **30*a* and 30*b* to a resonant circuit 12 including the inductive loop 13. This circuit differs somewhat from the previously described resonant circuits in that a principal capacitor 65 and a temperature compensation capacitor 66 are both connected in parallel with the inductive loop 13. In an exemplary embodiment of this invention the principal capacitor 65 was made from a polystyrene electrolyte which provides a negative temperature coefficient characteristic. The capacitor 65 was of a value of .12 mfd. The capacitor 66 is substantially smaller in value having a capacitance of .018 mfd. and being formed from a Mylar electrolyte. The polystyrene capacitor 65 will have a substantially constant capacitive value over temperature range which extends from —40° to +170° F. On the other hand, the Mylar capacitor has a temperature coefficient such that the capacitive value will increase as the temperature rises. It has been found experimentally that a Mylar capacitor connected as shown will tend to stabilize the operation of the oscillator 11** with the inductive loop circuit coupled thereto for the full range of temperatures to which this system may be subjected.

It may be appreciated that the presence detector system of this invention will be used in conjunction with other traffic control devices for the operation of traffic lights at highway intersections, and will be installed in a control box at a street intersection and will be electrically connected to an inductive loop which is embedded in the asphalt or concrete paving underlying traffic lanes. Presence detector systems are subjected to a range of temperatures. For example, a presence detector installed in a northern city having a cold climate may well be subjected to winter temperatures of the order of −60° F. A small heating element may be used to warm the unit to −40° F. On the other hand, other presence detectors may be installed in a warmer climate where the summer temperatures are known to rise to 110° F. We may appreciate the further fact that the presence detector unit may be installed within a metal control box with the sun's rays striking directly thereon, and that the temperature within the box may rise to +165° F. due only to the sun and the summer temperature. Since the presence detector system and other control devices within the control box dissipate power, the temperature within the control box and within the case of the presence detector unit may be raised additionally. In extreme situations, a blower or cooling fan may be used in the control box, but it is important that the unit continues to function with a minimum drift and instability throughout the entire temperature range of −40° F. to +170° F. The addition of the Mylar capacitor 66 together with the polystyrene capacitor 65 gives an improved temperature stability required by the presence detector unit.

The presence detector system of FIGURE 5 includes a somewhat modified amplifier 15′. The amplification is accomplished by the first transistor 36 followed by an emitter follower transducer 40. In this case, the base electrode of the transistor 36 is coupled to the negative reference potential by a resistor 67; and the emitter electrode is coupled to ground potential by a resistor 68. As in the amplifier 15 (FIGURE 2), a resistor 43 provides negative feedback for stabilization.

The system of FIGURE 5 has eliminated the diode rectifier by modifying the amplifier 18′. The amplifier 18′ includes a first transistor 51′ and a second transistor 53. The transistor 51′ is coupled to receive the amplified oscillator signal via the coupling capacitor 45. The transistor 51′ acts as a rectifier or peak detector of the alternating wave. A capacitor 70 is provided to store the rectified signal as a direct potential level. The transistors 51′ and 53 have both emitter electrodes coupled to the ground reference potential by a single emitter resistor 52′. Conduction in the transistor 53 is controlled by a corresponding conduction through the transistor 51′ since both transistors use the single emitter resistor 52′. The transistor 51′ is conductive during a part of each cycle of the alternating signal, to pass the peak value thereof to the storage capacitor 70, and the transistor 51′ is non-conductive for a portion of each cycle. Both the capacitor 70 and the capacitor 58 serve to filter out the high frequency signal of the oscillator 11 such that a direct potential level will appear as the output signal on the lead 19. Two further transistors 72 and 73 are connected as a Darlington amplifier for driving the relay 21 without unduly loading the amplifier 18′. The first transistor 72 of the Darlington amplifier has a base electrode directly connected to the lead 19, and has a collector electrode coupled to the ground reference potential by a resistor 74. The base electrode of the second transistor 73 is directly coupled to the emitter electrode of the transistor 72 to provide a power amplification for driving the relay 21.

Figure 6:
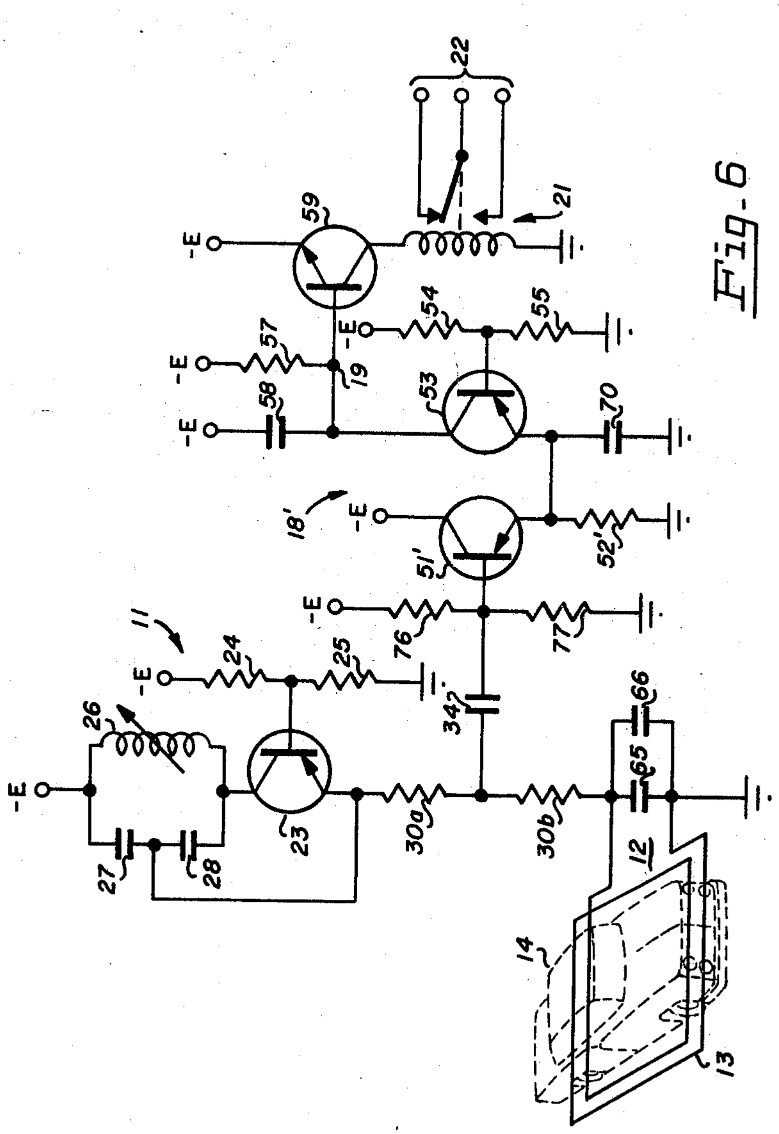

The presence detector system of FIGURE 6 is a much simplified version of the prior presence detector system. Even though this system may not have a stability equal to those systems shown in FIGURES 2 and 5, there are many applications wherein the simplified detector system of FIGURE 6 is adequate, and therefore, the more simplified system is economically desirable.

In the system of FIGURE 6, the oscillator circuit 11 is coupled to the second resonant circuit 12 including the inductive loop 13 similarly to FIGURES 3 and 5. The resonant circuit 12 may be provided with a principal polystyrene capacitor 65 and a temperature compensating Mylar capacitor 66. In the circuit of FIGURE 6 the amplifier 15–15′ has been eliminated and the rectifier amplifier 18′ is coupled to the oscillator 11 and resonant load circuit 12 by the capacitor 34. Biasing is provided to the base electrode of the first transistor 51′ by a potential dividing network including resistors 76 and 77. As in the system of FIGURE 5, the differential rectifier amplifier 18′ includes a first transistor 51′ coupled as a peak detector followed by a second transistor 53 for amplifying a direct current level. An output signal appears on the lead 19 which is coupled to the base electrode of the relay driving transistor 59.

In each of the embodiments, the resonant circuit 12 is coupled with appropriate resistors or impedance elements to load the oscillator 11. The arrangement of the resistors together with the signal amplifier sensing circuits coupled thereto constitute a means for sensing the power passed from the oscillator to the circuit of the loop 13. In each case, the change in power input to the loop circuit will be used to indicate the presence of a vehicle 14.

The presence detector system of this invention may be placed in service with a minimum of tuning and no calibration adjustment. Initially, the unit is connected to the loop and power supply with the inductance 26 set at a maximum value. The presence detector system is thereby energized in a condition which is badly out of tune; and the output relay 20 will switch to a position ordinarily indicative of the presence of a vehicle. A visual indication of this condition may be provided by an indicator lamp (not shown) which is coupled to a power source through the contacts of the relay 21. To tune the system, the inductor 26 is varied gradually decreasing the inductance and thereby increasing the frequency of oscillation until the output relay returns to the normal switching position with no vehicle near the loop extinguishing the indicator lamp coupled thereto.

The sensitivity of the circuit is determined by how closely the inductor 26 is tuned to a threshold value of operation of the relay 21. If the system is closely tuned to the threshold value, a maximum sensitivity will be obtained. If the inductor 26 is tuned to a point somewhat removed from the threshold value of relay operation, the system will be less sensitive but a greater degree of stability will be obtained. The tuning of this vehicle presence detector system is considerably simplified from other inductive loop vehicle detector systems. This system may be tuned by a single control knob associated with the variable inductor 26. The degree of sensitivity is determined merely by the setting of the inductor 26 as compared to the threshold point of relay operation (in the absence of vehicles). If a high sensitivity is desired to assure relay closure when low mass vehicles such as motorcycles move over the loop, the inductor 26 is timed close to the threshold point. If long range system stability is desired rather than maximum sensitivity, the inductor 26 may be tuned somewhat removed from the threshold point.

The presence detector systems of this invention enjoy an advantage of being fail-safe such that damage to the loop installations or the connections thereto will cause switching of the output relay 21. If the loop circuit is broken or has become disconnected, the oscillator may cease to oscillate or may oscillate at a frequency different from normal. In either event, the signal across the tuned circuit 12 and the capacitor 31 will be substantially reduced in amplitude or will disappear completely. The remainder of the circuitry will sense the decrease in amplitude of the signal to cause switching of the output relay 21. If the presence detector system is coupled to a traffic controller, a permanent call will be placed upon the controller such that a particular lane or phase of traffic will receive green lights even though no vehicles may be present in that traffic lane or phase. Therefore, a presence detector system with a faulty loop will become apparent to any observer who may notice that a particular traffic lane receive green lights with no traffic therein. This operation is deemed to be superior to a non-fail-safe operation wherein a malfunction may prevent a traffic lane from ever receiving a green light. The non-fail-safe operation is hazardous since, after an unduly long wait, a motorist will usually attempt to clear an intersection even though the traffic lights remain set against him. Therefore, vehicle presence detector systems of this invention enjoy the advantage of fail-safe operation, and in this respect are superior to non-fail-safe systems.

A further advantage of the vehicle presence detector systems of this invention lies in low cost and simplicity of manufacture. These circuits are more simplified than presence detector systems which are now commercially available. All components of these circuits are inexpensive and easily obtainable, and therefore, the manufacture of these presence detectors is economical.

The invention is claimed as follows:

1. A system for detecting the presence of a vehicle, said system comprising an oscillator having a tuned circuit for controlling its frequency of oscillation, a second tuned circuit including an inductive loop, resistance coupling means between the oscillator and the second tuned circuit for passing power to the second tuned circuit, said inductive loop being operable to vary in inductance value when a vehicle moves thereover, and voltage sensing means coupled to the inductive loop for sensing the voltage across the inductive loop.

2. A system for detecting the presence of a vehicle, said system comprising an oscillator including a transistor and a first tuned circuit coupled thereto, a second tuned circuit including an inductive loop underlying a path for vehicles, said second tuned circuit being coupled to the transistor and to the first tuned circuit by a resistive path between the transistor and the second tuned circuit for passing power to the second tuned circuit and the inductive loop, said inductive loop being operable to vary in inductive value and power dissipation when a vehicle moves thereover, and means for sensing the amplitude of the signal appearing across the inductive loop whereby the power passed into the resistive path to the inductive loop is sensed.

3. A system in accordance with claim 2 wherein the resistive path comprises two resistors connected in series between the transistor and the second tuned circuit, and wherein the means for sensing the amplitude of the signal appearing across the inductive loop comprises an amplifier circuit coupled to a point between the serially connected resistors.

4. A system in accordance with claim 2 wherein a first resistor is coupled between the oscillator and the second tuned circuit, and a second resistor is coupled between the tuned circuit and a point of reference potential, and wherein the means for sensing the amplitude of the signal is coupled to the point of connection betwe the second tuned circuit and the second resistor.

5. A system in accordance with claim 2 wherein the means for sensing the amplitude of the signal appearing across the inductive loop comprises a first amplifier, a rectifier circuit coupled to receive signals from the first amplifier, and a differential amplier circuit coupled to the rectifier circuit for comparing the rectified signal with an internally generated signal level, said differential amplifier being operable to provide an output signal when a vehicle moves over the inductive loop to detune the second tuned circuit.

6. A system in accordance with claim 2 wherein the means for sensing the amplitude of the signal appearing across the inductive loop comprises a first amplifying circuit, a rectifying transistor coupled to the first amplifying circuit for generating a direct signal level corresponding to the amplitude of the signal appearing across the inductive loop, and another transistor coupled to the rectifying transistor for amplifying the direct signal level to provide an output signal.

7. A system in accordance with claim 2 wherein the means for sensing the amplitude of the signal appearing across the inductive loop comprises a rectifying transistor coupled to the resistive path between the oscillator transistor and the second tuned circuit, said rectifying transistor being operable to generate a direct signal level and an amplifying transistor coupled to the rectifying transistor for amplifying the direct signal level to generate an output signal.

8. A system for detecting the presence of a vehicle and the like, comprising an oscillator, a tuned circuit formed of an inductive loop and a capacitor, resistance means directly connecting said tuned circuit to said oscillator and having a resistance value in relation to the impedance value of said tuned circuit which minimizes the effect of inductance changes in said loop on the operating frequency of said oscillator and permits substantial loading of said oscillator by said tuned circuit, and means for sensing an increase in the loading of said oscillator indicative of a vehicle and the like in proximity to said loop.

References Cited

UNITED STATES PATENTS

| | | |
|---|---|---|
| 1,950,741 | 3/1934 | Nein. |
| 2,983,852 | 5/1961 | Gray. |
| 3,205,352 | 9/1965 | Prucha. |
| 3,222,637 | 12/1965 | Gray. |
| 3,266,028 | 8/1966 | Taylor. |

THOMAS B. HABECKER, Primary Examiner

U.S. Cl. X.R.

331—117